United States Patent
Alassafi et al.

(10) Patent No.: US 11,068,693 B1
(45) Date of Patent: Jul. 20, 2021

(54) LIVENESS DETECTION IN FINGERPRINT-BASED BIOMETRIC SYSTEMS

(71) Applicant: King Abdulaziz University, Jeddah (SA)

(72) Inventors: Madini O Alassafi, Jeddah (SA); Abdulrahman A Alshdadi, Jeddah (SA); Hassan Dawood, Jeddah (SA); Rubab Mehboob, Jeddah (SA); Ali A Altalbe, Jeddah (SA); Rayed Alghamdi, Jeddah (SA); Hussain Dawood, Jeddah (SA); Chauhdary Sajjad Hussain, Jeddah (SA)

(73) Assignee: King Abdulaziz University, Jeddah (SA)

(*) Notice: Subject to any disclaimer, the term of this patent is extended or adjusted under 35 U.S.C. 154(b) by 0 days.

(21) Appl. No.: 17/136,172

(22) Filed: Dec. 29, 2020

(51) Int. Cl.
*G06K 9/62* (2006.01)
*G06K 9/00* (2006.01)
*G06K 9/38* (2006.01)

(52) U.S. Cl.
CPC .......... *G06K 9/00114* (2013.01); *G06K 9/001* (2013.01); *G06K 9/0008* (2013.01); *G06K 9/00906* (2013.01); *G06K 9/38* (2013.01)

(58) Field of Classification Search
CPC .......... G06K 9/00114; G06K 9/00906; G06K 9/00006–9/0012
See application file for complete search history.

(56) References Cited

PUBLICATIONS

Gragnaniello et al., "Local contrast phase descriptor for fingerprint liveness detection", Elsevier, Pattern Recognition, vol. 48, Issue 4, Apr. 2015, one bib sheet and pp. 1050-1058. (Year: 2015).*
Mehboob et al, "Live fingerprint detection using magnitude of perceived spatial stimuli and local phase information", J. of Electronic Imaging 27(5), 053038 (2018), Oct. 13, 2018, one bib sheet, one cover page, and pp. 053038-1 through 053038-13. (Year: 2018).*

* cited by examiner

*Primary Examiner* — Brian Werner
(74) *Attorney, Agent, or Firm* — W & C IP

(57) ABSTRACT

A fingerprint-based biometric system is used in security applications. To distinguish between live and spoof fingerprints, fundamental fingerprint features such as ridge contours are used. Ridge-valley contrast and ridge orientation, i.e., directional field of ridges, are extracted in spatial and frequency domains. Both feature sets are then quantized, and the quantized feature set is then integrated to populate a 2D histogram to represent the fundamental feature set extracted against a single fingerprint image. The extracted fundamental feature sets are used to discriminate between live and spoof fingerprints.

6 Claims, 5 Drawing Sheets

LIVENESS DETECTION IN FINGERPRINT-BASED BIOMETRIC SYSTEMS

BACKGROUND OF THE INVENTION

Field of the Invention

The present invention generally relates to fingerprint-based biometric systems and, more particularly, to a system and method which use the most reliable fundamental fingerprint features such as ridge contours to discriminate live and spoof fingerprints.

Background Description

The proliferation of internet technology has made the world more collaborative and virtual. Therefore, unsolicited security concerns for both organizations and private entities have been increase. Consequently, safeguarding the individual identity has become an imperative concern. Conventional methods of personal identification and verification, i.e., knowledge-based using passwords and PINs (Personal Identification Numbers) and token-based systems using tokens or cards are vulnerable to certain attacks such as data stream eavesdropping, passwords or PINs and cards or tokens can be stolen. In continuing efforts to safeguard and manage the integrity and privacy of the users and controlling the access of unauthorized users, the biometric technology plays a vital role. Biometric technology reliably verifies and identifies the individuals and also reduces the vulnerabilities faced by the conventional identification systems. Biometric technology identifies a person on the basis of their physiological or behavioral characteristics that are unique for each individual. Since fingerprint-based biometric systems are most commonly used for authentication and verification purposes because of their universality, permanence, distinctiveness and consistency. However, the imposters try to circumvent the potential security prospects of biometric system by presenting the fabricated biometric sample to the sensor or device. In addition, the misrepresentation of fingerprints, stealing and tampering the fingerprints with certain spoof materials and using them illegally is still an open challenge. The ultimate solution to encounter such kind of spoof attacks is liveness or presentation attack detection. In context of biometric verification and authentication, liveness or presentation attack detection is considered as a two-class classification problem where a fingerprint presented at the sensor can be either classified as live i.e., from an authentic person or spoof i.e., fake. Beefing up the security of biometric system with robust liveness detection system coupled with easy integration of sensors not only ensures the positive captures but also avoids the acceptance of unauthorized users.

In context of liveness detection in fingerprint-based biometric systems, both hardware and software-based approaches have been proposed. Hardware-based approaches for live fingerprint detection (LFD) extract the dynamic features such as temperature of the finger, pulse oxiometry, electrical conductivity, skin elasticity, and skin resistance. Software-based approaches consider both static (e.g., sweat pores and texture of ridges and valleys that remain consistent throughout the human life) and dynamic features (e.g., the skin color that changes over time) for detection of presentation attacks. The hardware-based approaches are quite resilient against certain spoof attacks; however, biometric verification devices coupled with additional hardware components may not be cost effective. Software-based approaches employing signal processing techniques are not only cost effective but are also highly reliable because of their flexibility, robustness, effectiveness, and are also least prone to errors. Presently, the majority of software-based approaches using signal processing techniques for LFD depend on the analysis of the perspiration through pores, skin deformation, image quality and global and local textural based features.

It has been observed that pores-based features are most difficult to be reproduced. Several techniques such as High pass and correlation filter techniques, the distance between the individual pores, Difference of Gaussian Filter (DoG), Gabor filter, watershed transform, morphological operators, and circular derivative operator had been proposed for extraction of pores-based features. In addition, the frequency of sweat pores in live fingerprints was slightly different than that in spoof fingerprints. Pores-based features such as pores, length of the pore, the angle between the pores and orientation of the pores have been extracted to discriminate live and spoof fingerprints. Minutiae-based feature information (i.e., ridge bifurcations and endings) of fingerprints has been extracted from the fingerprints for liveness detection. Minutiae features have been considered to determine live and spoof fingerprints by using Generative Adversarial Networks (GAN); however, minutiae extraction and pore extraction require high resolution (1000 dpi) fingerprint images. False ridge information may appear in the fingerprint if low resolution fingerprints are converted to such high resolution. Moreover, extraction of ridge contours prior to the extraction of pores decreases the classification error at the expense of increased computational cost.

Gradient values obtained by Laplacian operator are classified based on pre-trained back propagation (BP) neural network with varying parameters. Horizontal and vertical gradients have been computed for each pixel, and local contrast and orientation have been extracted by using Weber Local Descriptor (WLD). Other techniques which have been proposed incorporated both phase and spatial information of a fingerprint image to discriminate live and spoof fingerprints. The state-of-the-art Weber Local Descriptor (WLD) has been used in various liveness detection tasks. It has two disadvantages: 1) Orientation considers only pixels at horizontal and vertical positions; therefore, it does not adequately represent the local gradient orientation. 2) Positive and negative differences computed in differential excitation component counteract with each other. The proposed Weber Local Binary Descriptor (WLBD) utilized the calculation model of Local Binary Pattern (LBP) in order to overcome the imperfections of WLD. A fingerprint image has been analyzed in the differential excitation component and centralized binary pattern component to generate a final feature vector against a single fingerprint image. The co-occurrence probabilities of a fingerprint were computed by Weber Local Binary Pattern (WLBP) in spatial domain whereas circular symmetric Gabor features was computed in frequency domain; however, LBP misses the local structure because it does not consider the effect of central pixels. Moreover, the extracted binary data may be sensitive to noise. Other techniques which have been proposed consider only Level 1 features (ridge-valley pattern and orientation) for liveness detection. The existing approaches such as Local Binary Pattern (LBP) compares only the gray-values between the central pixel and neighborhood pixels, therefore, ignores the variations in pixel intensities, Gaussian smoothing in Laplacian of Gaussian (LOG) preserves the edge details but blurs the image thereby losses the discriminative ridge information present at the corners and junctions (ridge continuities), Local Phase Quantization (LPQ) and Histogram of Oriented Gradients (HOG) are sensitive to excessive blur and image rotation, respectively. HOG may not discriminate the two different local textural structures with similar gradients. Randomly sampled image patches in Binarized Statistical Image Features (BSIF) may not necessarily be the informative ones for learning purposes. Characteristic orientation component of Weber Local Descriptor (WLD) considers only 4 pixels present at horizontal and vertical positions in the neighborhood of 3×3. The Gabor transform lacks the orthonormal bases; therefore, a linear superposition cannot construct an inverse transform. Concatenation of WLD and LBP with LPQ has significantly reduced the classification error but at the expense of increased feature dimensions.

SUMMARY OF THE INVENTION

According to the present invention, the most reliable fundamental fingerprint features such as ridge contours are considered to discriminate live and spoof fingerprints. Ridge-valley contrast and ridge orientation, i.e., directional field of ridges are extracted in spatial and in frequency domain. Both feature sets are then quantized, and the exclusively quantized feature set is then integrated to populate a two-dimensional (2D) histogram to represent the fundamental feature set extracted against a single fingerprint image. The extracted fundamental feature sets are the basis for the discrimination of live and spoof fingerprints.

Our method considers a fingerprint as an elliptical region to incorporate significant information while minimizing the loss of significant ridge information. Moreover, the integration of both local and global features in spatial domain will not only control the effect of outliers but will also extract the comprehensive and robust information regarding the existence and discontinuities of probable ridge contours. The modified quantization scheme will reduce the information loss of loops and whorls while estimating the directional field.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing and other objects, aspects and advantages will be better understood from the following detailed description of a preferred embodiment of the invention with reference to the drawings, in which.

DETAILED DESCRIPTION THE INVENTION

Figure 1:
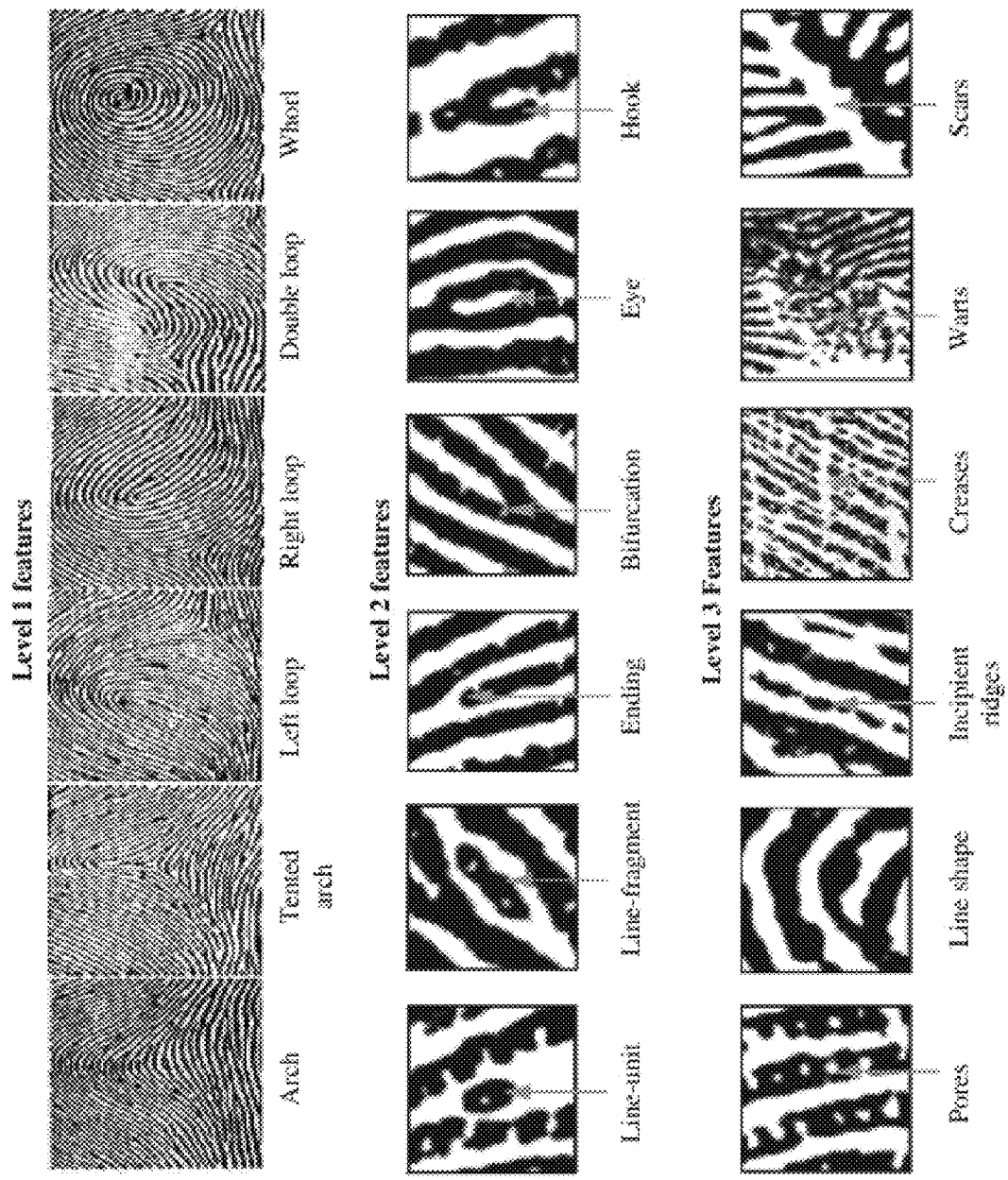
FIG. 1 is pictorial representations of Level 1 to Level 3 categories used in the classification of fingerprint images.

The fingerprint features are classified into three categories, i.e., Level 1, Level 2 and Level 3 features as generally illustrated in FIG. 1. Level 1 features consider the pattern flow and pattern type. Level 2 features include minutiae-based features such as ridge bifurcations and ridge endings. Level 3 features include both static and dynamic features. Pores-based features, ridge contours, incipient ridges are considered as the static features (such features remain consistent throughout the human life) whereas warts, scars and creases are considered as the dynamic features (such features may appear or disappear with the passage of time). FIG. 1 depicts the classification of features of fingerprints. Minutiae-based and pores-based features can effectively discriminate live and spoof fingerprints; however, extraction of such features require fingerprints of high resolution images, i.e., 1000 dpi. In the present invention, feature extraction is based on the previous model proposed in "Live fingerprint detection using magnitude of perceived spatial stimuli and local phase information" by R. Mehboob, H. Dawood, H. Dawood, M. U. Ryas, P. Guo, and A. Banjar in J. Electronic Imaging, vol. 27, no. 05, pp. 1-13, that also extracts features in spatial and frequency domain and integrates them while considering the dimensionality constraints. The Meboob et al. method produces effective results for live fingerprint detection; however, it has certain drawbacks: 1) The exponential transform of gradients, i.e., horizontal and vertical gradients, is proposed to compute the magnitude of perceived spatial stimuli. Since exponential transform is least susceptible to outliers such as noise, false ridge information, burrs, etc.; however, it has increased the average time consumption per fingerprint image. 2) The probable ridge information may occlude due to extraction the ridge-valley contrast globally. 3) Most of the significant ridge information, i.e., ridge endings, incipient ridges and bifurcations may have been missed by considering the fingerprint as a circular region while extracting the orientation information. 4) Orientation information has been quantized into 256 intervals; however, loops and whorls exhibit the rotation of 360 degrees. The proposed feature extraction method of the present invention and that of Mehboob et al. method differ in underlying concepts. The present invention employs a method that considers the most conspicuous Level 3 features, i.e., ridge contours, to establish the correspondence between the strength and discontinuities of ridge contours and their directional field to segregate live and spoof fingerprints. Moreover, it will also integrate the local and global features by avoiding the finite distance between the pixel intensities.

Ridge contours can effectively be preserved at fair resolution. Also, detection of spurious ridges introduced due to fabrication process may effectively discriminate live and spoof fingerprints in extracted ridge contours. Therefore, the present invention considers ridge contours for live fingerprint detection.

Figure 2:
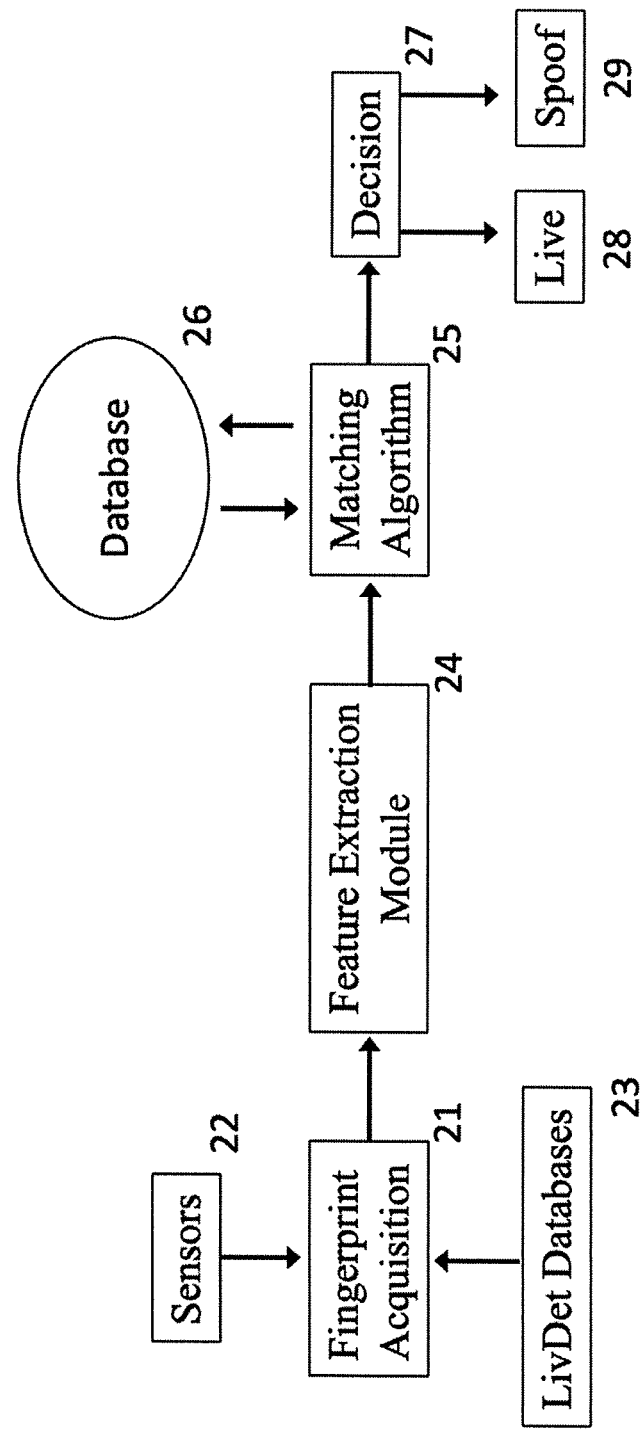
FIG. 2 is a block and flow diagram illustrating the framework of a live fingerprint detector.

FIG. 2 shows the framework of the live fingerprint detector according to the present invention. The first step in the process is fingerprint acquisition 21. This may be accomplished by, for example, sensors 22 or LivDet databases 23. The acquired fingerprint is input to the feature extraction module 24, discussed in more detail with reference to FIG. 3. The output of the feature extraction module 24 is input to a matching algorithm 25 which has access to a database 26. Based on the output of the matching algorithm 25, a decision is made by decision module 27 as to whether the input fingerprint is a live fingerprint 28 or a spoof fingerprint 29.

Figure 3:
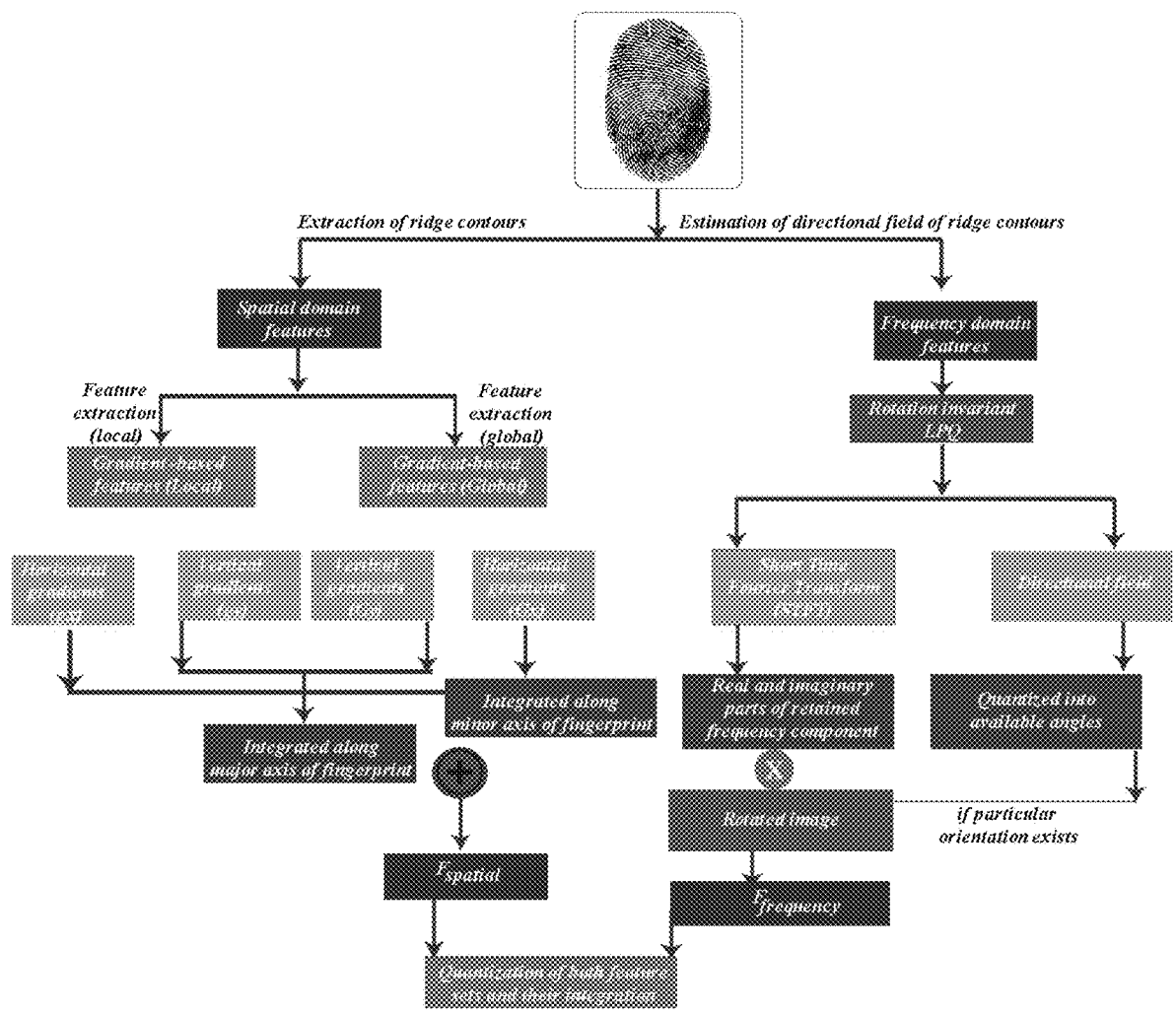
FIG. 3 is a block and flow diagram illustrating the operation and logic of the feature extraction module of the system of FIG. 2.

Feature extraction in the method according to the present invention is carried out in three phases as shown in FIG. 3. In the first phase, spatial domain component analyzes the fingerprint image to extract spatial domain features (ridge contours), i.e., Fspatial. Afterwards, the transform domain component extracts directional field of probable ridge contours, i.e., Ffrequency, in the frequency domain. Finally, the feature integration component integrates the features extracted by the aforementioned components.

Ridges correspond to the darker regions whereas the valleys correspond to lighter region of the fingerprint texture. Generally, ridge-valley pattern of fingerprints comprising of ridge contours can be extracted by using edge detection operators. The spatial domain component 1) minimizes the likelihood of detecting spurious edges as genuine ridge contours, 2) maximizes the likelihood of detecting probable ridge contours, 3) suppresses the outliers such as noise or burrs introduced due to dust or moisture on the surface of scanners, 4) preserves the ridge discontinuities and 5) minimizes the deterioration of ridges due to blurry artifacts. Since global feature methods consider the whole fingerprint as the subject area and extracts global features such as shape and texture, etc., the whole input fingerprint image is considered to extract gradient-based information along horizontal and vertical directions. Gradients are computed linearly and are also unaware of variations in neighborhood pixels. Consequently, the resultant ridge map, i.e., RMglobal, will likely to suffer from clutter, occlusions or noise; therefore, the method according to the invention also extracts ridge contours locally from the fingerprint image by considering the fact that local features are most discriminative and are also harder to tamper.

Horizontal and vertical gradients computed in both ridge maps, i.e., RMglobal and RMlocal will be registered into a single ridge map by considering the elliptical shape of a fingerprint. Ridge-valley structure continuously varies and is also uniformly distributed throughout the fingerprint image; therefore, frequency domain is most appropriate to analyze such quasi-periodic behavior of ridges and valleys of fingerprints. Moreover, directional field (DF) is also a fundamental high level feature to estimate the orientation of ridge-valley structure in a compact neighborhood at the coarsest level. Rotation invariant LPQ is blur insensitive and also provides compact feature representation incorporating all the spectrum characteristics. LPQ reduces the redundant information by retaining only distinctive features; therefore, LPQri is used to compute the directional field of the ridges in a fingerprint in the method according to the invention. However, the characteristic orientation of LPQri considers a fingerprint as the circular region. Consequently, much of the significant information may be lost. Therefore, characteristic orientation is obtained by constructing covariance matrix of gradient-based information while estimating the directional field of ridges in proposed method. Further, the relative weighting of these features considerably influences the discrimination power of LFD. Finally, the feature integration component registers both the feature sets into a single feature vector which will be sufficient enough to segregate live and spoof fingerprints. However, feature integration effectively increases the recognition accuracy but also increases the feature dimensions; therefore, the quantization scheme exclusively quantizes both feature sets and then integrates them together into a single feature set.

Figure 4:
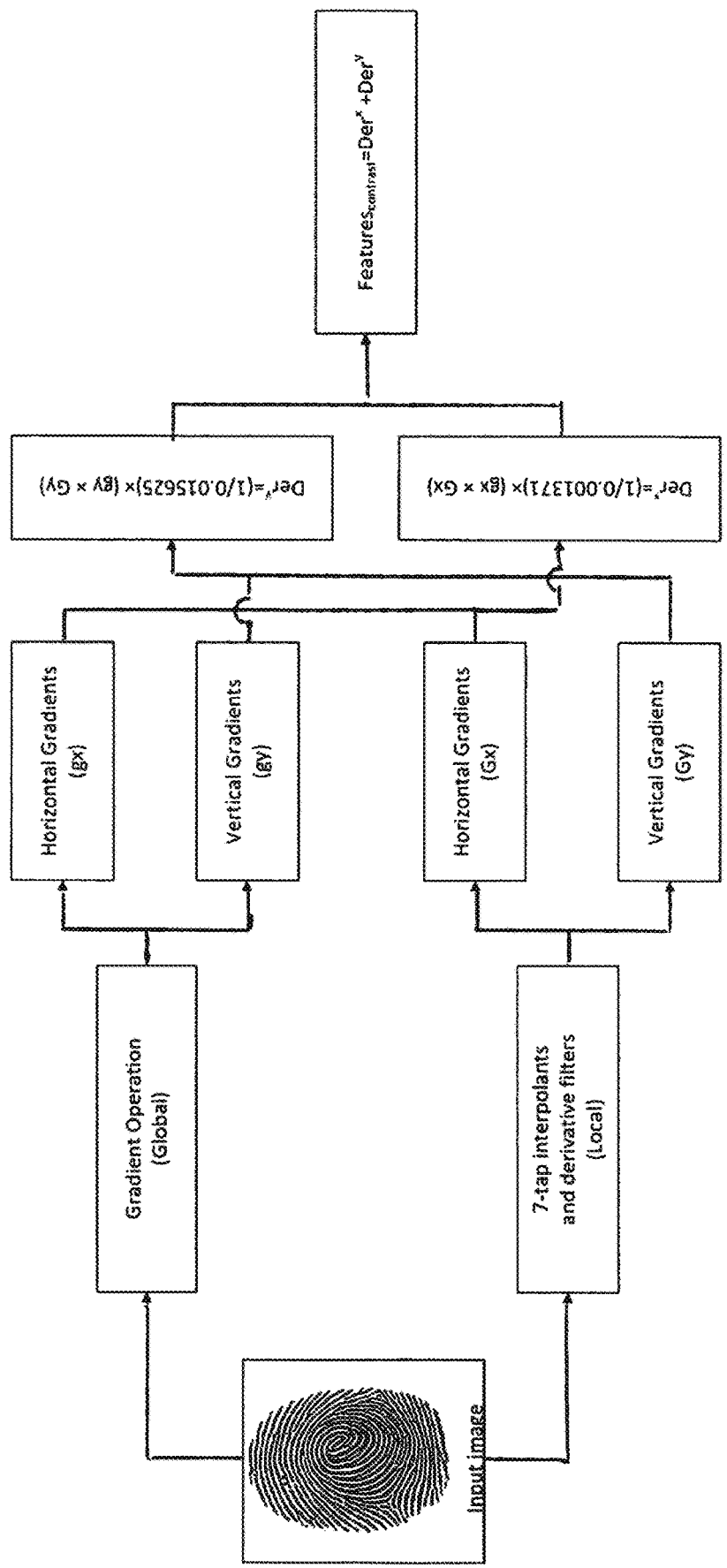
FIG. 4 is a block and flow diagram illustrating the operation and logic of the spatial domain component of the feature extraction module of FIG. 3.

The spatial domain component of the feature extraction module is shown in more detail in FIG. 4. This module extracts global and local ridge contours and their integration. The following filters are used to extract ridge contour information from the fingerprint locally.

7-Tap Interpolant
p=[0.004711  0.069321  0.245410  0.361117  0.245410  0.069321  0.004711]

$1^{st}$ Order Derivative Filter
d1=[0.018708  0.125376  0.193091  0.000000−0.193091−0.125376−0.018708]

$2^{nd}$ Order Derivative Filter
d2=[0.055336  0.1327778−0.056554−0.273118−0.056554  0.137778  0.055336]

p and d1 are convolved with the fingerprint observation to obtain the local ridge contour information along horizontal and vertical directions. Likewise, higher order derivative filter (d2) and p are convolved with the fingerprint observation to obtain ridge contour information along horizontal and vertical directions. The choice of the particular filter to obtain gradient information depends upon the type of fingerprints (PNG or bitmap) in the databases.

Figure 5:
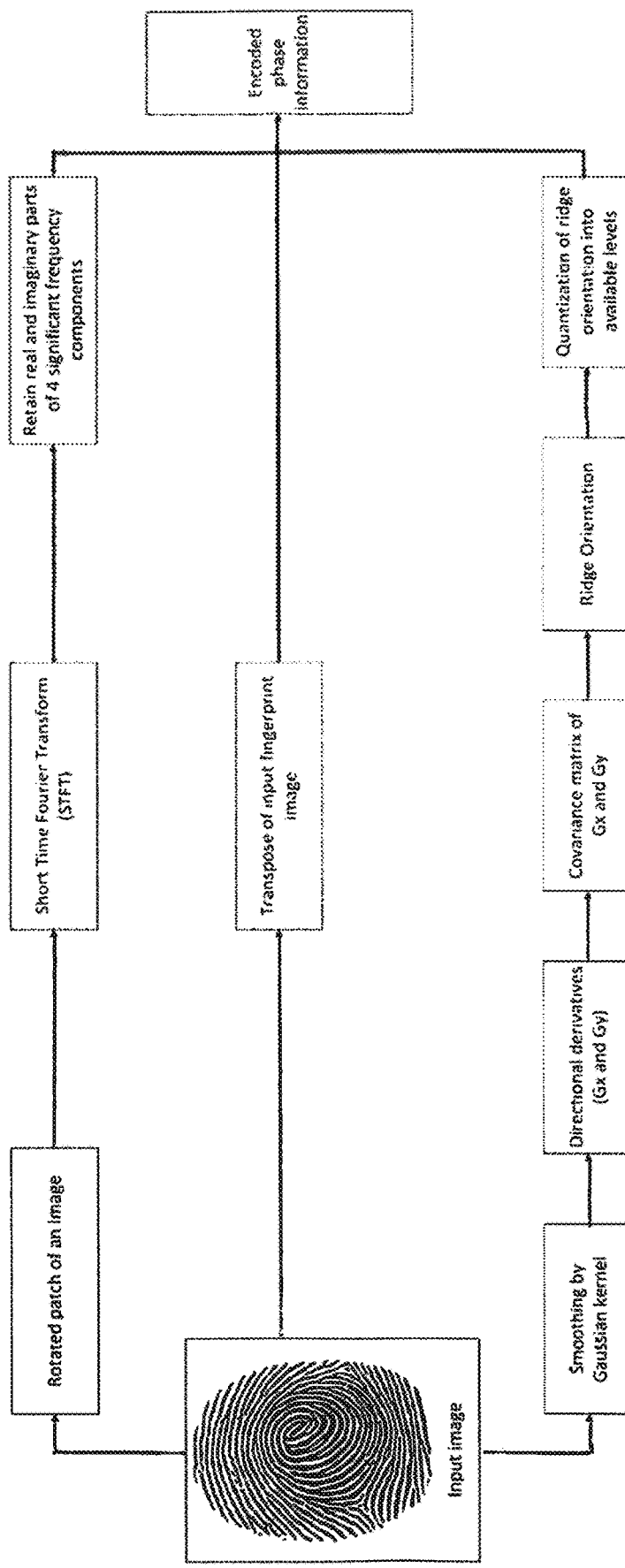
FIG. 5 is a block and flow diagram illustrating the operation and logic of the frequency domain component of the feature extraction module of FIG. 3.

The frequency domain component of FIG. 3 is shown in more detail in FIG. 5. This component extracts ridge orientation. The first four blocks at the bottom part of FIG. 5 represent the steps followed to obtain the orientation information of ridge contours. Initially, the fingerprint observation is pre-processed (smoothed) with the Gaussian kernel of size 3×3 to minimize the effect of outliers, e.g., noise, etc. 7-tap interpolant (p) and first order derivative filter (d1) are used to obtain the directional derivatives along horizontal and vertical directions of a pre-processed fingerprint observation. Covariance matrix of the obtained derivatives is then constructed by using the horizontal and vertical gradients. The covariance matrix is smoothed by the weighted summation operation. Finally, the ridge orientation is obtained by using the angles (sine and cosine) obtained by using the smoothed covariance information.

The feature matching module compares the features of fingerprint images, i.e., train and test images. In the liveness detection system according to the invention, a Support Vector Machine (SVM) is used for the classification of live and spoof fingerprints. In the SVM, the similarity between the features (i.e., of training and test set features) is measured by the Euclidean distance matric. This distance matric measures the distance between the two vectors of training and test images while taking the square root of the squared sum of the absolute differences. It can be computed as follows:

$$Matching_{dist} = \sqrt{(|P_i - Q_i|)}$$

Finally, the decision module determines the validity of input fingerprint images, i.e., test images. in terms of false acceptance and rejection rate and half total error rate. The kernel functions in SVM classification characterize the decision boundaries between the two classes, i.e., live and spoof. Since the classic linear kernel assumes that a straight line separates the two classes therefore, in the liveness detection system according to the invention, the Radial Basis Function (rbf) kernel is used to decide the decision boundary between the two classes. However, it is mainly optimized by varying two parameters, i.e., rbf sigma and cost factor. The response of the variations in these two parameters is twofold: 1) to determine the decision regions, and 2) to characterize the penalty of misclassifications. In the practice of the invention, the value of the cost factor is 700 on the basis of manual inspection conducted on the fingerprint databases. Besides, the value of rbf sigma is varied to obtain the minimal average classification error on live and spoof fingerprints. Moreover, a confusion matrix is used as an evaluation matrix to represent the obtained error rates. Different parameters w in the classification frameworks are set in such a way as to 1) minimize the HTER, 2) reduce the false rejection rate in order to avoid any invonvenience to authentic users, and 3) reduce the false acceptance rate in order to minimize false alarms.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A liveness detection fingerprint-based biometric system comprising:
   a fingerprint acquisition module providing an output image of an acquired fingerprint in an elliptical shape;
   a feature extraction module which receives the image of the acquired fingerprint from the fingerprint acquisition module,
   wherein the feature extraction module extracts global gradient-based information comprising shape and texture along horizontal and vertical directions of the image,
   wherein the feature extraction module extracts local features comprising ridge contours using first and second order derivative filters along the horizontal and vertical directions of the image, and
   wherein the feature extraction module uses rotation invariant local phase quantization to determine phase information of ridges;
   a matching algorithm module and database which receives feature sets from the feature extraction module, and integrates the feature sets as a final feature set which is used to populate a 2D histogram which represents a fundamental feature set extracted from the image; and
   a decision module which receives the fundamental feature set from the matching algorithm module which determines whether the acquired fingerprint image is a live or spoof fingerprint.

2. The liveness detection fingerprint-based biometric system of claim 1, wherein the fingerprint acquisition module includes a sensor for acquiring an image of a fingerprint.

3. The liveness detection fingerprint-based biometric system of claim 1, wherein the fingerprint acquisition module includes a database of live detection fingerprint images.

4. The liveness detection fingerprint-based biometric system of claim 1, wherein the feature extraction module determines a magnitude of perceived spatial stimuli of the fingerprint image by calculating a net variation of horizontal and vertical edge information and determines the local phase information subsections of the image by calculating the orientation and frequency of ridges and valleys of the fingerprint image.

5. A method for determining fingerprint liveness comprising the steps of:
   receiving an image of a fingerprint in an elliptical shape;
   extracting from the image
      global gradient-based information comprising shape and texture along horizontal and vertical directions of the image, and
      local features comprising ridge contours using first and second order derivative filters along the horizontal and vertical directions of the image;
   using rotation invariant local phase quantization to determine phase information of ridges;
   providing feature sets extracted from the image to a matching algorithm module and database,
   integrating the feature sets as a final feature set;
   populating a 2D histogram which represents the fundamental feature set extracted from the image; and
   producing a classification of the liveness of the fingerprint using the fundamental feature set.

6. The liveness detection fingerprint-based biometric system of claim 1, wherein global gradient-based information is linear and independent of variations in neighboring pixels.

* * * * *